Patented Dec. 1, 1953

2,661,302

UNITED STATES PATENT OFFICE 2,661,302

PROCESS OF PREPARING DENSE COMPOSITIONS OF ASPHALT AND ASBESTOS

John W. Keith, Beaumont, Tex., assignor to The Texas Company, New York, N. Y., a corporation of Delaware No Drawing. Application April 11, 1950,
Serial No. 155,355

3 Claims. (Cl. 106—282)

1

This invention relates to a process of preparing dense plastic compositions composed of asphalt cutbacks and asbestos and contemplates the incorporation of liquid organic silicones in the compositions.

The invention is concerned with certain improvements in a process of preparing dense plastic compositions of asphalt cutbacks and asbestos which are adapted for a variety of purposes such as insulating coverings, roofings, asphalt paints, roofing reinforcers and flashing compounds. The latter compounds are used to seal around chimneys or windows as a substitute for metal flashing or roofing strips. In the preparation of such compositions the asphalt is cut back with a thinner or volatile component such as naphtha, kerosene or other low boiling distillate, and the asbestos is incorporated in the cutback. The asphalt is composed of an asphaltic residue such as is obtained by vacuum or steam distillation or air blowing of crude petroleum residues. The cutback asphalt is mixed with the asbestos in various forms such as coarse fibers or very finely divided particles and sometimes mixtures of fine and coarse asbestos. The proportions of asphalt, volatile thinner and asbestos vary considerably depending upon the intended use of the product. Typical compositions will contain some 30–50% asphalt, 25–45% distillate and 10–40% asbestos (these percentages being by weight).

The present invention is based on the discovery that by incorporating relatively small proportions of liquid organic silicones in the asphalt cutback the time required for preparing the mixture of cutback and asbestos is greatly reduced and air is largely eliminated from the mixture.

The organic silicones useful for the purposes of the present invention include the polymeric organic silicon oxide condensation products. These products are sometimes referred to as organo-siloxanes. Structurally these compounds are composed essentially of a plurality of silicon atoms linked together through oxygen atoms with each silicon atom having attached to it at least one organic radical. The oily liquid condensation products obtained by the polymerization of organo-silane diols (each silicon atom having attached two organic radicals) such as, for example, the dimethyl silicones, are especially well adapted for the purposes of the present invention. Minute parts of the silicone such as a few parts per million in the asphalt cutback function to effect the improved results described herein.

In practicing the invention the liquid organic silicone is added to the asphalt cutback and then the asbestos filler is mixed with the cutback. The mixing is conducted under normal temperatures.

Asbestos as received in the sacks in which it is commonly marketed is in a somewhat agglomerated condition and it is common to feed the asbestos through a vibrating screen into the mixing kettle containing the asphalt cutback. In the prior practice the cutback was mechanically mixed with the asbestos as delivered through the screen and in the effort to obtain a uniform mixture of the ingredients the mixing was continued for a period of some 30 to 45 minutes after the completion of the delivery of the asbestos.

As an example of the invention a fire-resistant coating material was prepared with 44.5% (by weight) asphalt, 41% distillate and 14.5% fine asbestos (Johns-Manville Grade 7M). The asphalt was an air blown asphaltic residue of about 180 Ring and Ball melting point and of approximately 15 penetration at 77° F. The distillate was a fraction from Gulf Coast crude boiling under 400° F. A dimethyl silicone polymer was added to the mixture of asphalt and distillate in a proportion of one part silicone to one million parts cutback. This particular silicone polymer was obtained from the Dow Corning Corporation under the trade name of "200 Dow Corning Fluid" and had a viscosity of 100 centipoises. The asbestos was delivered to the mixing kettle through the vibrating screen while the stirrer was being operated in the mixing kettle. Immediately after all the asbestos had been delivered to the kettle a sample was taken from the kettle and it was found that the asbestos content was 14.5%, the exact proportion desired. When preparing the mixture without the addition of the silicone a sample drawn immediately after the addition of the asbestos showed an asbestos content of only 12.5% indicating the incomplete mixing. The mixing was then continued for 30 minutes. The product produced by this additional mixing still contained considerable quantities of air as was indicated by lighter weight per volume of material. A 55 gallon drum of the product made with the aid of the silicone weighed 6 pounds more than a drum of the product made without the silicone. Thus, the product obtained with the aid of the silicone without any additional mixing after the asbestos had been added was superior to the product obtained without the silicone even with the additional mixing.

In another example an asbestos roof cement was prepared consisting of 33.9% asphalt, 30.7% kerosene, 28.7% fine asbestos (Johns-Manville Grade 7M) and 6.7% coarse asbestos (Johns-Manville Grade 7D). The asphalt consisted of a mixture of asphaltic vacuum residua mixed and blown having a Ring and Ball softening point of 160 to 175 and a penetration at 77° F. of 30 to 40. Here again, the addition of only one part per million of the dimethyl silicone polymer enabled the production of a homogeneous mixture immediately after the addition of the asbestos fibre was completed and produced a product substantially free from contained air having a greater weight per volume than could be produced without the presence of the silicone.

An advantageous method of using the silicone is to first prepare a concentrate of silicone and kerosene. Thus, for example, a kerosene concentrate of dimethyl silicone polymer was added to a cutback composed of 46% asphalt and 54% distillate fraction from Gulf Coast crude boiling under 400° F. The concentrate was added in a proportion of one part per one hundred thousand parts of cutback which amounted to one part of silicone per million parts of cutback. A composition was prepared with this cutback containing the slicone polymer with 89.6% cutback and 10.4% short asbestos and another composition was prepared with the same materials and same proportions except that no silicone was present. In comparing the weights of the products collected in 55 gallon drums, it was found that the material prepared with the silicone weighed 9.2 pounds per drum heavier than the material made without the silicone, thus indicating the function of the silicone in eliminating air from the material.

Although a preferred embodiment of the invention has been described herein, it will be understood that various changes and modifications may be made therein, while securing to a greater or less extent some or all of the benefits of the invention, without departing from the spirit and scope thereof.

I claim:

1. A process for preparing dense plastic compositions comprising asphalt cutback and asbestos filler which comprises adding volatile thinner containing a minute proportion of a liquid lower dialkyl slicone polymer to asphalt to form an asphalt cutback, adding asbestos filler to said asphalt cutback and subjecting said silicone-containing mixture of asphalt cutback and asbestos filler to agitation at atmospheric temperature whereby air is rapidly released from said mixture and there is formed a dense plastic composition comprising asphalt cutback and asbestos filler.

2. A process according to claim 1 in which the asphalt cutback contains silicone in a concentration of the order of about one part per million.

3. A process according to claim 1 in which dimethyl silicone is employed.

JOHN W. KEITH.

References Cited in the file of this patent

UNITED STATES PATENTS

| Number | Name | Date |
| --- | --- | --- |
| 2,258,218 | Rochow | Oct. 7, 1941 |
| 2,322,059 | Roediger | June 15, 1943 |
| 2,362,839 | Marc | Nov. 14, 1944 |
| 2,396,690 | Fair, Jr. | Mar. 19, 1946 |
| 2,396,910 | Zaisser | Mar. 19, 1946 |
| 2,435,124 | Bollinger | Jan. 27, 1948 |

OTHER REFERENCES

Foster, "Oil & Gas Journal" 44, pages 86 and 87, Oct. 6, 1945.